United States Patent
Shafiulla et al.

(10) Patent No.: US 12,026,136 B2
(45) Date of Patent: Jul. 2, 2024

(54) CONSOLIDATING RESOURCE DATA FROM DISPARATE DATA SOURCES

(71) Applicant: SAP SE, Walldorf (DE)

(72) Inventors: Mohammed Saifulla Shafiulla, Brisbane (AU); Lochner Louw, Ashgrove (AU)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/986,340

(22) Filed: Nov. 14, 2022

(65) Prior Publication Data
US 2024/0160611 A1 May 16, 2024

(51) Int. Cl.
*G06F 16/00* (2019.01)
*G06F 16/215* (2019.01)
*G06F 16/25* (2019.01)

(52) U.S. Cl.
CPC .......... *G06F 16/215* (2019.01); *G06F 16/258* (2019.01)

(58) Field of Classification Search
CPC .............................. G06F 16/215; G06F 16/258
See application file for complete search history.

(56) References Cited

U.S. PATENT DOCUMENTS

| | | | | |
|---|---|---|---|---|
| 2002/0062241 A1* | 5/2002 | Rubio | ............... | G06Q 30/0202 707/999.002 |
| 2009/0089630 A1* | 4/2009 | Goldenberg | ........ | G06F 16/2462 714/704 |
| 2009/0182580 A1* | 7/2009 | Martin | ................... | G16H 10/60 707/999.005 |
| 2013/0006931 A1* | 1/2013 | Nelke | .................... | G06Q 10/10 707/625 |
| 2013/0031044 A1* | 1/2013 | Miranda | ................ | G06N 20/00 706/47 |
| 2016/0196256 A1* | 7/2016 | Chen | .................... | G06F 40/103 715/709 |

* cited by examiner

*Primary Examiner* — Syed H Hasan
(74) *Attorney, Agent, or Firm* — SCHWEGMAN LUNDBERG & WOESSNEER, P.A.

(57) ABSTRACT

In some embodiments, a computer system may obtain resource data from a data source of an entity, where the resource data corresponds to resources of the entity, and then determine that the resource data does not comply with one or more rules. In response to the determining that the resource data does not comply with the rule(s), the computer system may send a notification to an electronic destination associated with the entity, where the notification indicates that the resource data does not comply with the rule(s). Next, the computer system may obtain a modified version of the resource data from the data source, determine that the modified version of the resource data complies with the rule(s), and, in response to the determining that the modified version of the resource data complies with the rule(s), store the modified version of the resource data in a data registry.

20 Claims, 6 Drawing Sheets

THE FOLLOWING DATA IS NOT IN COMPLIANCE WITH THE DATA QUALITY RULES OF THE RESOURCE INTELLIGENCE NETWORK:

| DATA SOURCE | RESOURCE DATA FIELD | NON-COMPLIANCE ISSUE |
|---|---|---|
| TRNSPRT-TRUCKV | ROW 4 / COLUMN F | FORMAT: ASSET_OPERATOR ≠ 3 INITIALS |
| TRNSPRT-TRUCKV | ROW 9 / COLUMN V | COMPLETENESS: MODEL IS MISSING |

IN ORDER TO ENABLE THE ABOVE-IDENTIFIED DATA TO BE REGISTERED IN THE RESOURCE INTELLIGENCE NETWORK, PLEASE CORRECT THE IDENTIFIED NON-COMPLIANCE ISSUES IN THE DATA SOURCE.

CONSOLIDATING RESOURCE DATA FROM DISPARATE DATA SOURCES

BACKGROUND

Computer systems may be used to manage data about resources of an entity, such as equipment that is owned or operated by the entity. An entity may have relationships with multiple other entities that own or operate resources and use their own respective computer systems to manage data about their respective resources.

BRIEF DESCRIPTION OF THE DRAWINGS

Some example embodiments of the present disclosure are illustrated by way of example and not limitation in the figures of the accompanying drawings, in which like reference numbers indicate similar elements.

FIG. 3 illustrates an example notification.

DETAILED DESCRIPTION

Figure 1:
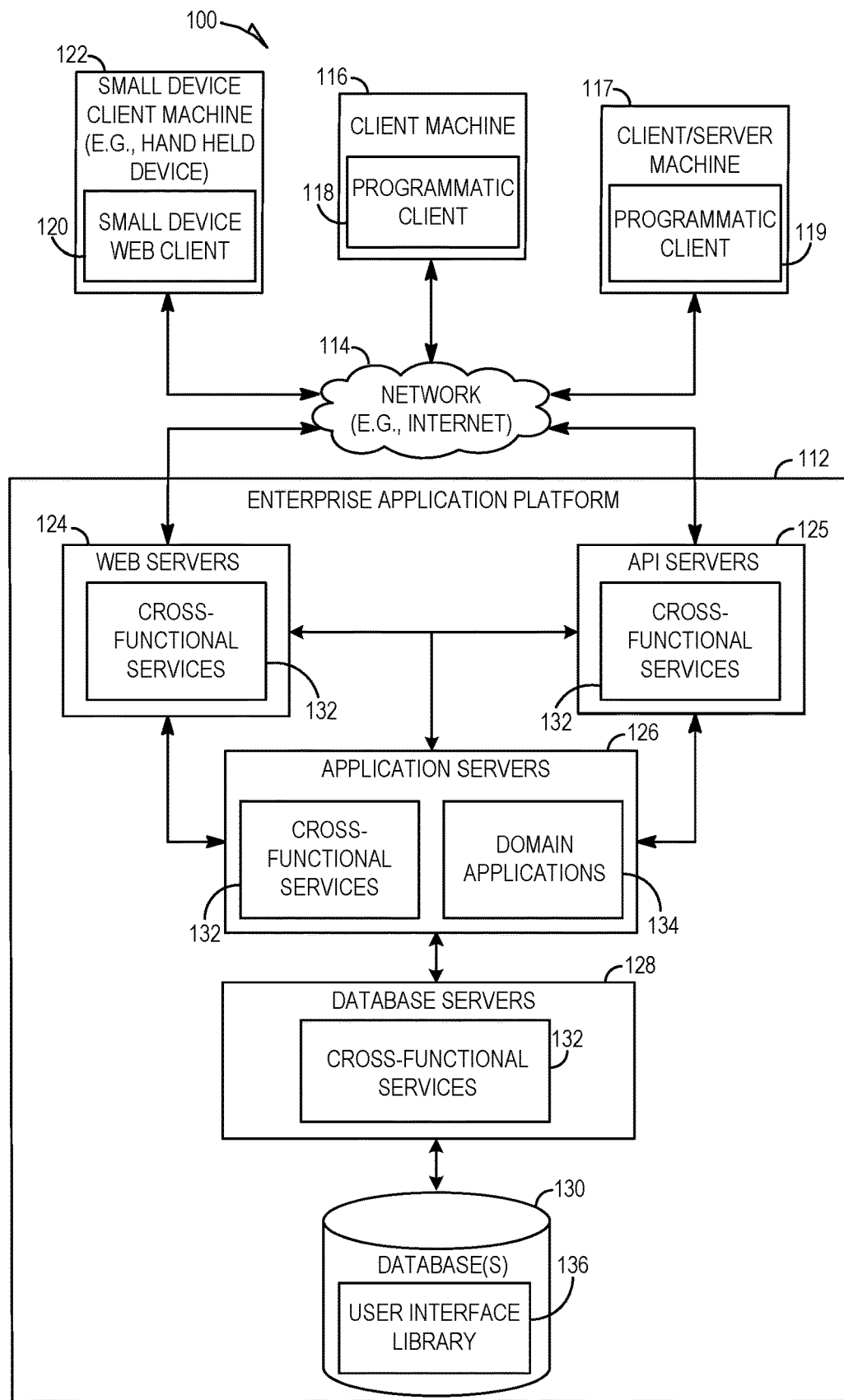
FIG. 1 is an example network diagram illustrating a system.

Example methods and systems of consolidating resource data from disparate data sources are disclosed. In the following description, for purposes of explanation, numerous specific details are set forth in order to provide a thorough understanding of example embodiments. It will be evident, however, to one skilled in the art that the present embodiments can be practiced without these specific details.

In some example embodiments, a computer system may provide a platform on which users may register resources of entities by providing resource data to the platform from their corresponding data sources. This resource data may then be used in downstream software applications. However, technical problems arise when attempting to consolidate resource data from disparate data sources. For example, the format or other aspects of the resource data from the data sources may be incompatible with technical aspects of the computer system into which the resource data is being consolidated. This incompatibility between the resource data and the technical aspects of the computer system may interfere with the ability of the computer system to consolidate the resource data and may result in errors or improper functioning in the use of the resource data in downstream software applications. Furthermore, users often are not aware of this incompatibility until the negative consequences are already occurring, so their ability to resolve the issue in a timely manner is limited. In addition to the issues discussed above, other technical problems may arise as well.

The implementation of the features disclosed herein involves a non-generic, unconventional, and non-routine operation or combination of operations. By applying one or more of the solutions disclosed herein, some technical effects of the system and method of the present disclosure are to consolidate resource data from disparate data sources. In some embodiments, a computer system may obtain resource data from a data source of an entity, where the resource data corresponds to resources of the entity, and then determine that the resource data does not comply with one or more data quality rules. In response to the determining that the resource data does not comply with the data quality rule(s), the computer system may transmit a notification to an electronic destination (e.g., an e-mail address) associated with the entity, where the notification indicates that the resource data does not comply with the data quality rule(s). Next, the computer system may obtain a modified version of the resource data from the data source, determine that the modified version of the resource data complies with the data quality rule(s), and, in response to the determining that the modified version of the resource data complies with the data quality rule(s), store the modified version of the resource data in a data registry.

By conditioning the storing of the resource data in the data registry on a determination that the resource data complies with the data quality rule(s) and transmitting a notification indicating non-compliance in response to a determination that the resource data does not comply with the data quality rule(s), the computer system effectively avoids the incompatibility problems associated with consolidating resource data from disparate data sources. Other technical effects will be apparent from this disclosure as well.

The methods or embodiments disclosed herein may be implemented as a computer system having one or more modules (e.g., hardware modules or software modules). Such modules may be executed by one or more hardware processors of the computer system. In some example embodiments, a non-transitory machine-readable storage device can store a set of instructions that, when executed by at least one processor, causes the at least one processor to perform the operations and method steps discussed within the present disclosure.

The details of one or more variations of the subject matter described herein are set forth in the accompanying drawings and the description below. Other features and benefits of the subject matter described herein will be apparent from the description and drawings, and from the claims.

FIG. 1 is an example network diagram illustrating a system 100. A platform (e.g., machines and software), in the example form of an enterprise application platform 112, provides server-side functionality, via a network 114 (e.g., the Internet) to one or more clients. FIG. 1 illustrates, for example, a client machine 116 with programmatic client 118 (e.g., a browser), a small device client machine 122 with a small device web client 120 (e.g., a browser without a script engine), and a client/server machine 117 with a programmatic client 119.

Turning specifically to the enterprise application platform 112, web servers 124 and Application Program Interface (API) servers 125 can be coupled to, and provide web and programmatic interfaces to, application servers 126. The application servers 126 can be, in turn, coupled to one or more database servers 128 that facilitate access to one or more databases 130. The web servers 124, API servers 125, application servers 126, and database servers 128 can host cross-functional services 132. The cross-functional services 132 can include relational database modules to provide support services for access to the database(s) 130, which includes a user interface library 136. The application servers 126 can further host domain applications 134. The web servers 124 and the API servers 125 may be combined.

The cross-functional services 132 provide services to users and processes that utilize the enterprise application platform 112. For instance, the cross-functional services 132 can provide portal services (e.g., web services), database services, and connectivity to the domain applications 134 for users that operate the client machine 116, the client/server machine 117, and the small device client machine 122. In addition, the cross-functional services 132 can provide an environment for delivering enhancements to existing applications and for integrating third-party and legacy applications with existing cross-functional services 132 and domain applications 134. In some example embodiments, the system 100 comprises a client-server system that employs a client-server architecture, as shown in FIG. 1. However, the embodiments of the present disclosure are, of course, not limited to a client-server architecture, and could equally well find application in a distributed, or peer-to-peer, architecture system.

Figure 2:
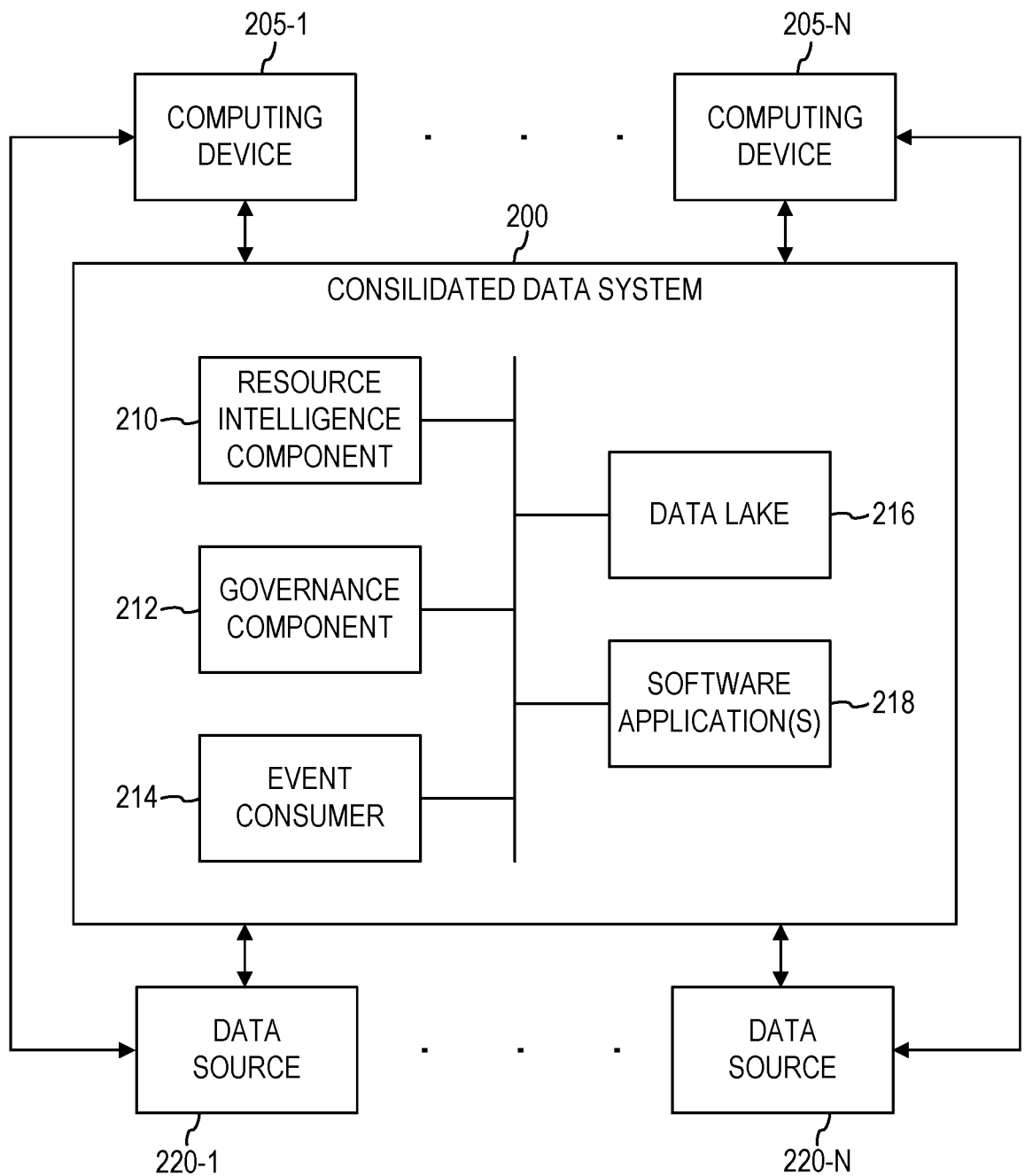
FIG. 2 is a block diagram illustrating an example consolidated data system.

FIG. 2 is a block diagram illustrating an example consolidated data system 200. The components shown in FIG. 2 may be configured to communicate with each other via one or more network connections. In some example embodiments, the consolidated data system 200 comprises any combination of one or more of a resource intelligence component 210, a governance component 212, an event consumer 214, a data lake 216, and one or more software applications 218. One or more of the components of the migration system 200 may be implemented by the enterprise application platform 112 of FIG. 1. For example, the resource intelligence component 210, the governance component 212, the event consumer 214, and the software application(s) 218 may be incorporated into the application server(s) 126, and the data lake 216 may be incorporated into the database servers 128. However, the consolidated date system 200 may be implemented in other ways as well.

In some example embodiments, the consolidated data system 200 may be configured to consolidate a plurality of different sets of resource data obtained from a plurality of disparate data sources 220. Each set of resource data may correspond to a different set of resources. A resource may comprise any item that can be used by an entity, such as a piece of equipment or another asset that can be used by a person or an organization. The resource data may comprise a corresponding identification of each one of the set of resources and one or more corresponding attributes of each one of the set of resources. For example, one set of resource data may be obtained from a data source 220 of a company that uses a set of trucks in the operation of its business functions, and the resource data may include a corresponding identification for each one of the trucks in the set of trucks, as well as corresponding attributes for each one of the trucks in the set of trucks (e.g., make, model, age, condition). Other types of resources and resource data are also within the scope of the present disclosure.

The consolidated data system 200 may connect an entity with multiple other entities, such as a plurality of sub-entities, in order to build a consolidated network of resources. One example of entities being connected in this way is when there is a central authority that controls various different sub-entities, such as with public sector organizations. For example, a federal government may be a central authority over state run businesses that have sub-contractors internally and externally who manage resources on their behalf. Although the central authority entity may want a top-down view of all of their resources where resource ownership is distributed with the sub-entities, the sub-entities may be managing the resource data in their own corresponding data source 220 over which the central authority entity does not have control. For example, a first sub-entity of the central authority entity may store and manage its own resource data in a first data source 220-1 over which the central authority entity does not have control, a second sub-entity of the central authority entity may store and manage its own resource data in a second data source 220-2 over which the central authority entity does not have control, and so on and so forth through an Nth sub-entity of the central authority that may store and manage its own resource data in an Nth data source 220-N over which the central authority entity does not have control (where N is a positive integer).

Each sub-entity of the central authority entity may access and manage its corresponding data source 220 via a computing device 205 of the sub-entity. For example, one or more users who belong to the first sub-entity may access and manage the first data source 220-1 via a first computing device 205-1, one or more users who belong to the second sub-entity may access and manage the second data source 220-2 via a second computing device 205-2, and so on and so forth through one or more users who belong to the Nth sub-entity and may access and manage the Nth data source 220-N via an Nth computing device 205-N (where N is a positive integer). Each data source 220 may comprise any physical or virtual resource from which data may be obtained. Examples of data sources 220 include, but are not limited to, a database, a file server, a data lake (e.g., a system or repository of data stored in its natural/raw format), and a software application, such as an enterprise resource planning application that is configured to manage processes of an organization, including tracking resources of an organization and the status of commitments of the organization (e.g., purchase orders, service requests, etc.). Other types of data sources 220 are also within the scope of the present disclosure.

Distribution of resource management across multiple disparate data sources 220 of different sub-entities, such as described in the example above with multiple sub-entities of a central authority entity, creates a challenge for the consolidated data system 200 in consolidating all of the resource data from the disparate data sources 220 into a single registry of resource data for audits, visibility, regulated resource management, and other downstream applications and functions controlled by the central authority entity, as the disparate data sources 220 may have different connection protocols, no standard resource definition, and no standard data exchange format. The consolidated data system 200 may address these technical challenges using the features disclosed herein.

In some example embodiments, the governance component 212 may be configured to obtain corresponding sets of resource data from different data sources 220 of different entities. For example, the governance component 212 may obtain a first set of resource data from a first data source 220-1 of a first entity, a second set of resource data from a second data source 220-2 of a second entity, and so on and so forth through an Nth set of resource data from an Nth data source 220-N of an Nth entity (where N is a positive integer). The governance component 212 may obtain the sets of resource data in a variety of ways. For example, the governance component 212 may pull resource data from one or more of the data sources 220. Additionally or alternatively, one or more of the data sources 220 may push resource data to the governance component 212. The governance component 212 may obtain resource data from one data source 220 using one method and obtain resource data from another data source 220 using another method. For example, the governance component 212 may pull a set of resource data from a data source 220 that comprises a file server or a data lake, and another data source 220 that comprises an enterprise resource planning application may push a set of resource data to the governance component 212. Other ways of the governance component 212 obtaining sets of resource data from the data sources 220 are also within the scope of the present disclosure.

The governance component 212 may be configured to transform the obtained resource data to comply with a data model defined in the resource intelligence component 210 for specific resource classes. The resource intelligence component 210 may provide a user interface via which a user of a computing device 205 may build the data model. The data model may define how data points are organized and connected within a database, including logical constraints such as table names, fields, data types, and the relationships between these entities. The data model may represent a data structure in graphical form containing boxes of various shapes to represent activities, functions, or entities and lines to represent associations, dependencies, or relationships. The data model may be used to create a relational database with each row representing an entity and the fields in that row containing attributes. Key data elements may be used to link tables together.

In some example embodiments, the governance component 212 may be configured to determine whether the resource data complies with one or more data quality rules. The one or more data quality rules may comprise a completeness rule that requires that a predetermined type of data be present. For example, in one embodiment in which the resource data includes a corresponding identification for each one of the trucks in the set of trucks, as well as corresponding attributes for each one of the trucks in the set of trucks, the completeness rule may require that the resource data include the make, model, age, condition, and operator of each one of the trucks in the set of trucks. Additionally or alternatively, the one or more data quality rules may comprise a format rule that requires a predetermined format for a predetermined type of data. For example, the format rule may require that the operator of the truck be identified in the resource data using three letters, such as the three initials of the operator of the truck. Other types of data quality rules are also within the scope of the present disclosure.

If the governance component 212 determines that a set of resource data does not comply with the data quality rule(s), then the governance component 212 may, in response to that determination, transmit, or otherwise send, a notification to an electronic destination associated with the entity from whose data source 220 the set of resource data was obtained. The electronic destination may comprise any physical or virtual component that is capable of receiving an electronic message or other piece of digital communication. Examples of electronic destinations include, but are not limited to, e-mail addresses or accounts, cell phone numbers or accounts, database management application accounts, messaging application addresses or accounts, social networking addresses or accounts, and any user interface displayed on a computing device. Other types of electronic destinations that can be associated with users are also within the scope of the present disclosure.

In some example embodiments, the notification transmitted by the governance component 212 to the electronic destination associated with the entity may indicate that the set of resource data does not comply with the data quality rule(s). FIG. 3 illustrates an example notification 300. In the example shown in FIG. 3, the notification 300 includes a statement that the set of resource data is not in compliance with data quality rules followed by details of each instance of non-compliance. For example, the details included in the notification 300 include an identification of the data source 220 from which the set of resource data was obtained (e.g., a file name), a specific location of the non-compliant resource data within the data source 220 (e.g., a row and column of the data field in which the non-compliant resource data is found), and a specification of how the resource data fails to comply with the data quality rules (e.g., the specific way in which the resource data fails to comply with the specific format rule or the specific completeness rule). Additionally, the notification 300 may also include a statement that prompts the user to make a correction of the resource data in the corresponding data source 220 in order to bring the resource data into compliance with the data quality rules and enable the resource data to be registered in the consolidated data system 200. Other configurations of the notification 300 are also within the scope of the present disclosure. The notification 300 may be displayed on a computing device 205 of a user who belongs to the entity (e.g., on a computing device of an employee of an organization).

Subsequent to the transmitting of the notification to the electronic destination associated with the entity, the user may modify the resource data in the data source 220 to bring the resource data into compliance with the data quality rule(s). For example, the user may access the resource data in the data source 220 via a computing device 205 and make any additions, deletions, or other corrections necessary to make the resource data comply with the data quality rule(s), thereby creating a modified version of the set of resource data in the data source 220. The governance component 212 may then obtain the modified version of the set of resource data from the data source 220, such as by using the same techniques described above when obtaining the original version of the set of resource data from the data source 220, and then determine whether the modified version of the set of resource data complies with the data quality rule(s).

If the governance component 212 determines that a set of resource data does comply with the data quality rule(s), then the governance component 212 may, in response to that determination, store the set of resource data in a data registry of the resource intelligence component 210. For example, the set of resource data may be pushed into a data registry associated with an account of the entity in the resource intelligence component 210 using an API of the resource intelligence component 210. In some example embodiments, the data registry may comprise a database. However, other types of data storage components may be used for implementing the data registry as well.

The resource intelligence component 210 may comprise a software application that is configured to provide a secure cloud-based information exchange for different entities, such as equipment manufacturers, operators, and maintenance providers in equipment-intensive industries, as well as other types of entities and sub-entities. In some example embodiments, the resource intelligence component 210 may provide a single and central repository where disparate, but connected, entities that maintain resources can input or access all of the latest information about the resources they manufacture, own, use, service, or otherwise have a stakeholder's interest in regardless of the format of that information in the data source 220 from where it was obtained. The resource intelligence component 210 may be configured to make resource data available not only for the entity that owns the resources corresponding to the resource data, but also to other stakeholder entities or sub-entities in order for them to have a better insight when it comes to those resources.

The resource intelligence component 210 may generate a corresponding event in response to the set of resource data being stored in the data registry. The event consumer 214 may be configured to consume the events generated by the resource intelligence component 210 and feed the resource data corresponding to the events into the data lake 216. The data lake 216 may be used by the consolidated data system 200 as an intermediate storage area to stage the resource data. The data lake 216 may also be used by the consolidated data system 200 as a data layer for reporting purposes. For example, the software application(s) 218 may consume the resource data in the data lake 216 and use the resource data in one or more of its functions. In some example embodiments, the functions may comprises a data reporting function or a data analysis function. For example, the software application(s) 218 may be configured to functions that include, but are not limited to, reporting, online analytical processing, analytics, data mining, process mining, complex event processing, predictive analytics, and prescriptive analytics. The software application(s) 218 may be configured to perform other functions as well.

Figure 4:
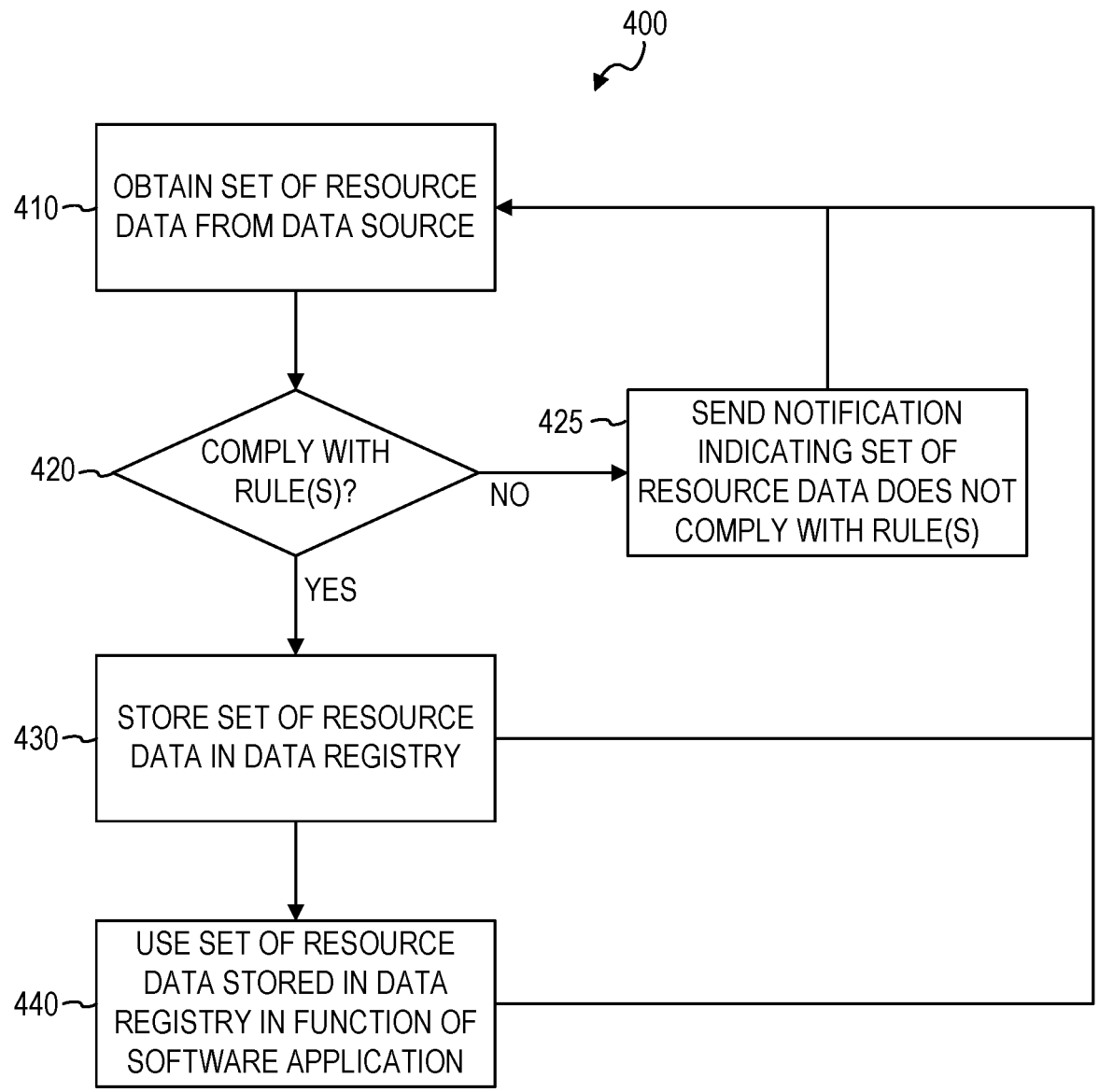
FIG. 4 is a flowchart illustrating an example method of consolidating resource data from disparate data sources.

FIG. 4 is a flowchart illustrating an example method 400 of consolidating resource data from disparate data sources. The method 400 can be performed by processing logic that can comprise hardware (e.g., circuitry, dedicated logic, programmable logic, microcode, etc.), software (e.g., instructions run on a processing device), or a combination thereof. In one example embodiment, one or more of the operations of the method 400 are performed by the consolidated data system 200 of FIG. 2 or any combination of one or more of its components (e.g., the resource intelligence component 210, the governance component 212, the event consumer 214, the data lake 216, or the software application (s) 218).

At operation 410, the consolidated data system 200 may obtain a set of resource data from a data source 220 of an entity. In some example embodiments, the data source 220 may comprise a database, a file server, a data lake (e.g., a system or repository of data stored in its natural/raw format), or a software application, such as an enterprise resource planning application that is configured to manage processes of an organization, including tracking resources of an organization and the status of commitments of the organization (e.g., purchase orders, service requests, etc.). Other types of data sources 220 are also within the scope of the present disclosure. The set of resource data may correspond to a set of resources of the entity. The set of resources may comprise items that can be used by the entity, such as pieces of equipment or other assets that can be used by a person or an organization. The set of resource data may comprise a corresponding identification of each one of the set of resources and one or more corresponding attributes of each one of the set of resources.

Next, the consolidated data system 200 may, at operation 420 determine whether the set of resource data complies with one or more data quality rules. The one or more data quality rules may comprise a completeness rule that requires that a predetermined type of data be present. Additionally or alternatively, the one or more data quality rules may comprise a format rule that requires a predetermined format for a predetermined type of data quality rules are also within the scope of the present disclosure.

If the consolidated data system 200 determines that the set of resource data does not comply with the one or more data quality rules, then the consolidated data system 200 may, in response to that determination, send (e.g., transmit) a notification, such as the notification 300 of FIG. 3, to an electronic destination associated with the entity, at operation 425. The notification may indicate that the set of resource data does not comply with the one or more data quality rules. The electronic destination may comprise any physical or virtual component that is capable of receiving an electronic message or other piece of digital communication. The method 400 may then return to operation 410, where the consolidated data system 200 may obtain a modified version of the set of resource data from the data source 220, and then determine, at operation 420, whether the modified version of the set of resource data complies with the one or more data quality rules.

If the consolidated data system 200 determines that the set of resource data (modified version or original version) complies with the one or more data quality rules, then the consolidated data system 200 may, at operation 430, store the set of resource data in a data registry in response to that determination. Next, the consolidated data system 200 may continue to obtain other sets of resource data from either the same data source 220 or other data sources 220 by returning to operation 410. Additionally or alternatively, the method 400 may use one or more sets of resource data stored in the data registry in a function of a software application 218 being operated by a user associated with another entity. In some example embodiments, the function may comprise a data reporting function or a data analysis function. However, other types of functions are also within the scope of the present disclosure. The consolidated data system 200 may then continue to obtain other sets of resource data from either the same data source 220 or other data sources 220 by returning to operation 410.

It is contemplated that any of the other features described within the present disclosure can be incorporated into the method 400.

Figure 5:
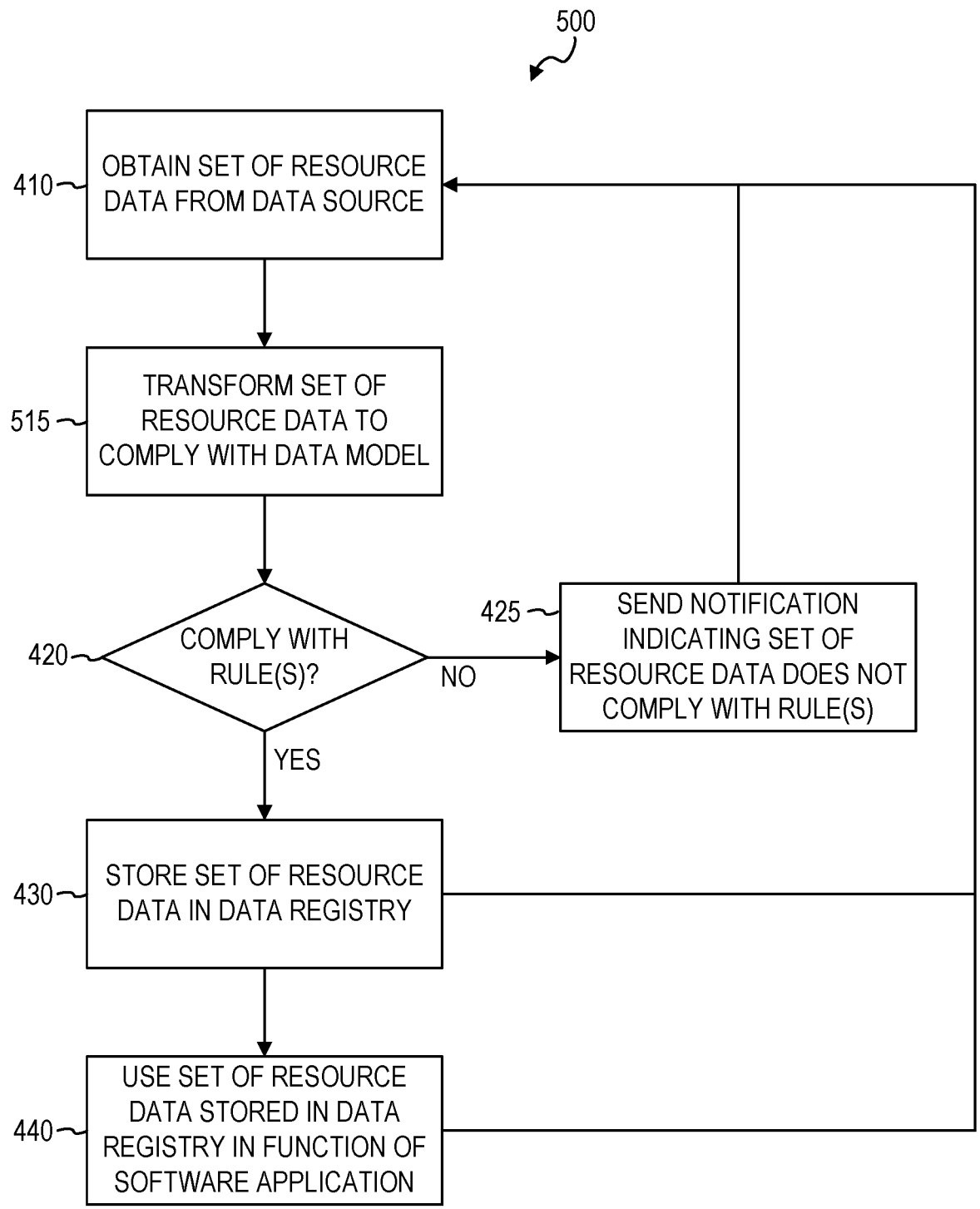
FIG. 5 is a flowchart illustrating another example method of consolidating resource data from disparate data sources.

FIG. 5 is a flowchart illustrating another example method 500 of consolidating resource data from disparate data sources. The method 500 can be performed by processing logic that can comprise hardware (e.g., circuitry, dedicated logic, programmable logic, microcode, etc.), software (e.g., instructions run on a processing device), or a combination thereof. In one example embodiment, one or more of the operations of the method 500 are performed by the consolidated data system 200 of FIG. 2 or any combination of one or more of its components (e.g., the resource intelligence component 210, the governance component 212, the event consumer 214, the data lake 216, or the software application (s) 218). The method 500 may include operation 515 being performed prior to operation 420 of the method 400. In other example embodiments, operation 515 may be performed subsequent to operation 420 and before operation 430.

At operation 515, the consolidated data system 200 may transform the set of resource data to comply with a data model. The data model may define how data points are organized and connected within a database, including logical constraints such as table names, fields, data types, and the relationships between these entities. The data model may represent a data structure in graphical form containing boxes of various shapes to represent activities, functions, or entities and lines to represent associations, dependencies, or relationships. The data model may be used to create a relational database with each row representing an entity and the fields in that row containing attributes. Key data elements may be used to link tables together.

It is contemplated that any of the other features described within the present disclosure can be incorporated into the method 500.

In view of the disclosure above, various examples are set forth below. It should be noted that one or more features of an example, taken in isolation or combination, should be considered within the disclosure of this application.

Example 1 includes a computer-implemented method performed by a computer system having a memory and at least one hardware processor, the computer-implemented method comprising: obtaining a first set of resource data from a first data source of a first entity, the first set of resource data corresponding to a first set of resources of the first entity; determining that the first set of resource data does not comply with one or more data quality rules; in response to the determining that the first set of resource data does not comply with the one or more data quality rules, sending a notification to an electronic destination associated with the first entity, the notification indicating that the first set of resource data does not comply with the one or more data quality rules; subsequent to the sending of the notification to the electronic destination associated with the first entity, obtaining a modified version of the first set of resource data from the first data source; determining that the modified version of the first set of resource data complies with the one or more data quality rules; and, in response to the determining that the modified version of the first set of resource data complies with the one or more data quality rules, storing the modified version of the first set of resource data in a data registry.

Example 2 includes the computer-implemented method of example 1, wherein the first set of resource data comprises a corresponding identification of each one of the first set of resources and one or more corresponding attributes of each one of the first set of resources.

Example 3 includes the computer-implemented method of example 1 or example 2, wherein the one or more data quality rules comprise a completeness rule that requires that a predetermined type of data be present.

Example 4 includes the computer-implemented method of any one of examples 1 to 3, wherein the one or more data quality rules comprise a format rule that requires a predetermined format for a predetermined type of data.

Example 5 includes the computer-implemented method of any one of examples 1 to 4, further comprising: obtaining a second set of resource data from a second data source of a second entity, the second set of resource data corresponding to a second set of resources of the second entity; determining that the second set of resource data complies with the one or more data quality rules; in response to the determining that the second set of resource data complies with the one or more data quality rules, storing the second set of resource data in the data registry; and using the modified version of the first set of resource data and the second set of resource data stored in the data registry in a function of a software application being operated by a user associated with a third entity.

Example 6 includes the computer-implemented method of any one of examples 1 to 5, further comprising: transforming the modified version of the first set of resource data to comply with a first data model prior to performing the storing of the modified version of the first set of resource data in the data registry; and transforming the second set of resource data to comply with the first data model prior to performing the storing of the second set of resource data in the data registry.

Example 7 includes the computer-implemented method of any one of examples 1 to 6, wherein the function comprises a data reporting function or a data analysis function.

Example 8 includes the computer-implemented method of any one of examples 1 to 7, wherein the first data source comprises a first enterprise resource planning application and the second data source comprises a second enterprise resource planning application.

Example 9 includes the computer-implemented method of any one of examples 1 to 8, wherein the first data source comprises a first enterprise resource planning application and the second data source comprises a file server or a data lake.

Example 10 includes the computer-implemented method of any one of examples 1 to 9, wherein the third entity comprises a central authority having control over the first entity and the second entity.

Example 11 includes a system comprising: at least one processor; and a non-transitory computer-readable medium storing executable instructions that, when executed, cause the at least one processor to perform the method of any one of examples 1 to 10.

Example 12 includes a non-transitory machine-readable storage medium, tangibly embodying a set of instructions that, when executed by at least one processor, causes the at least one processor to perform the method of any one of examples 1 to 10.

Example 13 includes a machine-readable medium carrying a set of instructions that, when executed by at least one processor, causes the at least one processor to carry out the method of any one of examples 1 to 10.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 114 of FIG. 1) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

Figure 6:
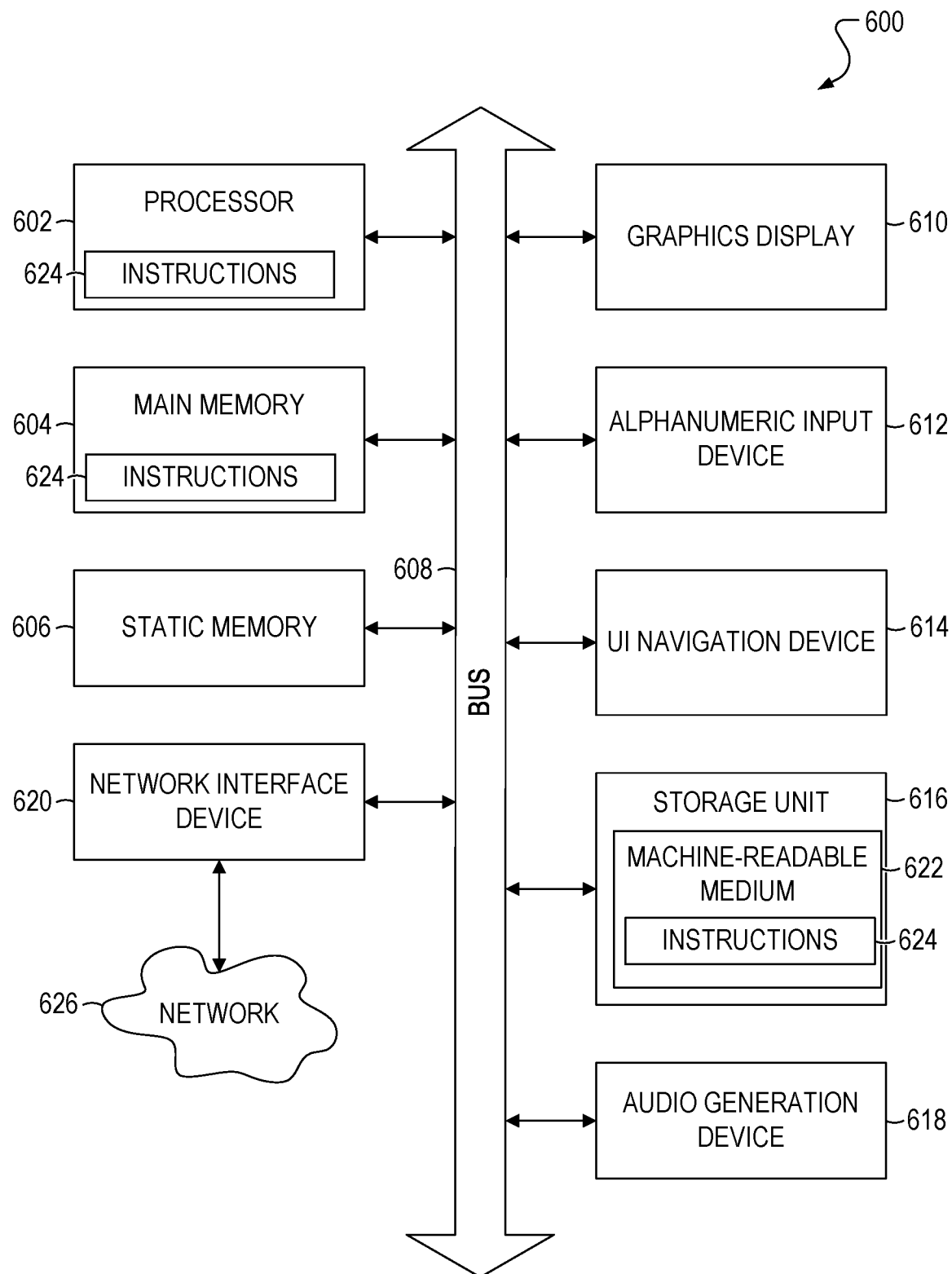
FIG. 6 is a block diagram of an example computer system on which methodologies described herein can be executed.

FIG. 6 is a block diagram of a machine in the example form of a computer system 600 within which instructions 624 for causing the machine to perform any one or more of the methodologies discussed herein may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604, and a static memory 606, which communicate with each other via a bus 608. The computer system 600 may further include a graphics or video display unit 610 (e.g., a liquid crystal display (LCD) or a cathode ray tube (CRT)). The computer system 600 also includes an alphanumeric input device 612 (e.g., a keyboard), a user interface (UI) navigation (or cursor control) device 614 (e.g., a mouse), a storage unit (e.g., a disk drive unit) 616, an audio or signal generation device 618 (e.g., a speaker), and a network interface device 620.

The storage unit 616 includes a machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604 and/or within the processor 602 during execution thereof by the computer system 600, the main memory 604 and the processor 602 also constituting machine-readable media. The instructions 624 may also reside, completely or at least partially, within the static memory 606.

While the machine-readable medium 622 is shown in an example embodiment to be a single medium, the term "machine-readable medium" may include a single medium or multiple media (e.g., a centralized or distributed database, and/or associated caches and servers) that store the one or more instructions 624 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The instructions 624 may further be transmitted or received over a communications network 626 using a transmission medium. The instructions 624 may be transmitted using the network interface device 620 and any one of a number of well-known transfer protocols (e.g., HTTP). Examples of communication networks include a LAN, a WAN, the Internet, mobile telephone networks, POTS networks, and wireless data networks (e.g., WiFi and WiMAX networks). The term "transmission medium" shall be taken to include any intangible medium capable of storing, encoding, or carrying instructions for execution by the machine, and includes digital or analog communications signals or other intangible media to facilitate communication of such software.

This detailed description is merely intended to teach a person of skill in the art further details for practicing certain aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

Unless specifically stated otherwise, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A computer-implemented method performed by a computer system comprising a memory and at least one hardware processor, the computer-implemented method comprising:
    obtaining a first set of resource data from a first data source of a first entity, the first set of resource data corresponding to a first set of resources of the first entity;
    determining that the first set of resource data does not comply with one or more data quality rules;
    in response to the determining that the first set of resource data does not comply with the one or more data quality rules, sending a notification to an electronic destination associated with the first entity, the notification indicating that the first set of resource data does not comply with the one or more data quality rules;
    subsequent to the sending of the notification to the electronic destination associated with the first entity, obtaining a modified version of the first set of resource data from the first data source;
    transforming the modified version of the first set of resource data to comply with a first data model, the first data model defining relationships between entities in a database of a data registry, the first data model comprising graphical elements representing the entities and lines representing the relationships between the entities;
    determining that the modified version of the first set of resource data complies with the one or more data quality rules; and
    in response to the determining that the modified version of the first set of resource data complies with the one or more data quality rules, storing the modified version of the first set of resource data in the database of the data registry.

2. The computer-implemented method of claim 1, wherein the first set of resource data comprises a corresponding identification of each one of the first set of resources and one or more corresponding attributes of each one of the first set of resources.

3. The computer-implemented method of claim 1, wherein the one or more data quality rules comprise a completeness rule that requires that a predetermined type of data be present.

4. The computer-implemented method of claim 1, wherein the one or more data quality rules comprise a format rule that requires a predetermined format for a predetermined type of data.

5. The computer-implemented method of claim 1, further comprising:
    obtaining a second set of resource data from a second data source of a second entity, the second set of resource data corresponding to a second set of resources of the second entity;
    determining that the second set of resource data complies with the one or more data quality rules;
    in response to the determining that the second set of resource data complies with the one or more data quality rules, storing the second set of resource data in the data registry; and
    using the modified version of the first set of resource data and the second set of resource data stored in the data registry in a function of a software application being operated by a user associated with a third entity.

6. The computer-implemented method of claim 5, further comprising:
    transforming the second set of resource data to comply with the first data model prior to performing the storing of the second set of resource data in the data registry.

7. The computer-implemented method of claim 5, wherein the function comprises a data reporting function or a data analysis function.

8. The computer-implemented method of claim 5, wherein the first data source comprises a first enterprise resource planning application and the second data source comprises a second enterprise resource planning application.

9. The computer-implemented method of claim 5, wherein the first data source comprises a first enterprise resource planning application and the second data source comprises a file server or a data lake.

10. The computer-implemented method of claim 5, wherein the third entity comprises a central authority having control over the first entity and the second entity.

11. A system of comprising:
    at least one hardware processor; and
    a non-transitory computer-readable medium storing executable instructions that, when executed, cause the at least one hardware processor to perform computer operations comprising:
        obtaining a first set of resource data from a first data source of a first entity, the first set of resource data corresponding to a first set of resources of the first entity;
        determining that the first set of resource data does not comply with one or more data quality rules;
        in response to the determining that the first set of resource data does not comply with the one or more data quality rules, sending a notification to an electronic destination associated with the first entity, the notification indicating that the first set of resource data does not comply with the one or more data quality rules;

subsequent to the sending of the notification to the electronic destination associated with the first entity, obtaining a modified version of the first set of resource data from the first data source;

transforming the modified version of the first set of resource data to comply with a first data model, the first data model defining relationships between entities in a database of a data registry, the first data model comprising graphical elements representing the entities and lines representing the relationships between the entities;

determining that the modified version of the first set of resource data complies with the one or more data quality rules; and in response to the determining that the modified version of the first set of resource data complies with the one or more data quality rules, storing the modified version of the first set of resource data in the database of the data registry.

12. The system of claim 11, wherein the first set of resource data comprises a corresponding identification of each one of the first set of resources and one or more corresponding attributes of each one of the first set of resources.

13. The system of claim 11, wherein the one or more data quality rules comprise a completeness rule that requires that a predetermined type of data be present.

14. The system of claim 11, wherein the one or more data quality rules comprise a format rule that requires a predetermined format for a predetermined type of data.

15. The system of claim 11, wherein the computer operations further comprise:

obtaining a second set of resource data from a second data source of a second entity, the second set of resource data corresponding to a second set of resources of the second entity;

determining that the second set of resource data complies with the one or more data quality rules;

in response to the determining that the second set of resource data complies with the one or more data quality rules, storing the second set of resource data in the data registry; and using the modified version of the first set of resource data and the second set of resource data stored in the data registry in a function of a software application being operated by a user associated with a third entity.

16. The system of claim 15, wherein the computer operations further comprise:

transforming the second set of resource data to comply with the first data model prior to performing the storing of the second set of resource data in the data registry.

17. The system of claim 15, wherein the function comprises a data reporting function or a data analysis function.

18. The system of claim 15, wherein the first data source comprises a first enterprise resource planning application and the second data source comprises a second enterprise resource planning application.

19. The system of claim 15, wherein the first data source comprises a first enterprise resource planning application and the second data source comprises a file server or a data lake.

20. A non-transitory machine-readable storage medium tangibly embodying a set of instructions that, when executed by at least one hardware processor, causes the at least one processor to perform computer operations comprising:

obtaining a first set of resource data from a first data source of a first entity, the first set of resource data corresponding to a first set of resources of the first entity;

determining that the first set of resource data does not comply with one or more data quality rules;

in response to the determining that the first set of resource data does not comply with the one or more data quality rules, sending a notification to an electronic destination associated with the first entity, the notification indicating that the first set of resource data does not comply with the one or more data quality rules;

subsequent to the sending of the notification to the electronic destination associated with the first entity, obtaining a modified version of the first set of resource data from the first data source;

transforming the modified version of the first set of resource data to comply with a first data model, the first data model defining relationships between entities in a database of a data registry, the first data model comprising graphical elements representing the entities and lines representing the relationships between the entities;

determining that the modified version of the first set of resource data complies with the one or more data quality rules; and in response to the determining that the modified version of the first set of resource data complies with the one or more data quality rules, storing the modified version of the first set of resource data in the database of the data registry.

* * * * *